350-96.1 SR ERENCE SEARCH ROO

XR 3,526,880

Sept. 1, 1970 F. FILIPPAZZI 3,526,880

PERMANENT ELECTRO-OPTICAL MEMORY SYSTEM USING LIGHT CONDUCTING RODS OR FIBERS

Filed Oct. 23, 1967 2 Sheets-Sheet 1

BY FRANCO FILIPPAZZI

INVENTOR.

George V. Eltgroth and Joseph B. Forman Attys

Sept. 1, 1970 F. FILIPPAZZI 3,526,880

PERMANENT ELECTRO-OPTICAL MEMORY SYSTEM USING LIGHT CONDUCTING RODS OR FIBERS

Filed Oct. 23, 1967 2 Sheets-Sheet 2

BY FRANCO FILIPPAZZI

INVENTOR.

George V. Eltgroth and Joseph B. Forman Attys

United States Patent Office 3,526,880
Patented Sept. 1, 1970

3,526,880
PERMANENT ELECTRO-OPTICAL MEMORY SYSTEM USING LIGHT CONDUCTING RODS OR FIBERS

Franco Filippazzi, Milan, Italy, assignor to Olivetti-General Electric S.p.A., Caluso, Turin, Italy, a corporation of Italy Filed Oct. 23, 1967, Ser. No. 677,166
Claims priority, application Italy, Oct. 27, 1966, 29,325/66
Int. Cl. G11c *13/04*
U.S. Cl. 340—173 8 Claims

ABSTRACT OF THE DISCLOSURE

A binary digital memory, wherein a different binary code may be stored for each of a plurality of optical fibers by means of a pattern of discrete alterations of each fiber along the length thereof, and wherein the code of a particular fiber is read by illuminating one end of the corresponding fiber and by sensing with photoelectric devices the illumination emitted from the fiber at predetermined points along the length thereof.

Figure 1:
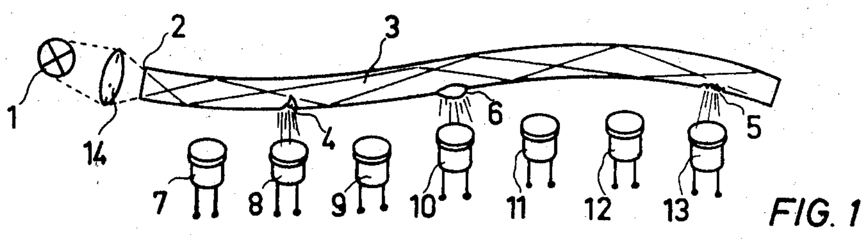

The present invention relates to permanent memory systems, and more particularly to those systems wherein the information elements are recorded practically permanently on a suitable support so that the contents of the memory cannot be changed without changing the support.

These permanent memories acquire an ever-increasing importance in the data processing techniques and are usually integrated parts of the sequential control units of electronic computers. As these permanent memories are not affected by the reading operations, they offer superior reliability and are not subject to the danger of faulty or accidental deletion or alteration of the registered information.

Prior art permanent memories are however generally bulky when compared to the reduced dimensions which can be attained in other component parts of modern data processing equipment, as through the miniaturization and integration techniques. This is due either to the low density of registered information that can be attained or, when a high density is attained, as in the photographic storage systems, to the complexity of the devices required for reading.

The object of the present invention is to provide a permanent memory system having a high density of registered information, a reduced cost, a relatively limited space requirement, a reliable and easy reading operation and very high read-out speed.

According to the invention, the information is registered by selectively altering predetermined element portions of the surface of elongated optical members, which are adapted to be internally illuminated at predetermined instants of time so that part of the internal illuminating energy is propagated therethrough to permit said altered portions to cooperate with suitable photoelectrical devices to generate electrical signals.

A preferred embodiment thereof includes the use of optical fibers illuminated at one end and showing suitable alterations at predetermined points along their surface, so that at the altered points the light is refracted to the outside. The surface of the optical fibers provides the proper support for permanently registering an information "word," that is, an ordered sequence of binary information elements, or "bits." A plurality of said optical fibers are so arranged that the light emitted by the altered points corresponding to homologous bits, that is, to bits occupying places of the same order in the different words, may influence a single photoelectric device, different photoelectric devices being assigned to the bits of the different orders. Sending a light pulse along a fiber, the set of all the photoelectric devices read, practically at the same time, all bits forming the word corresponding to the illuminated fiber, and subsequently and selectively projecting a light pulse into the different fibers, the corresponding words are immediately read.

A very compact memory systems having high information density, low cost and high operation speed may be constructed according to the invention.

These and other features and advantages of the invention will be apparent from the following description of an illustrative embodiment thereof, when considered with the attached drawings, in which:

FIG. 1 schematically represents an optical fiber used for registering information.

Figure 2:
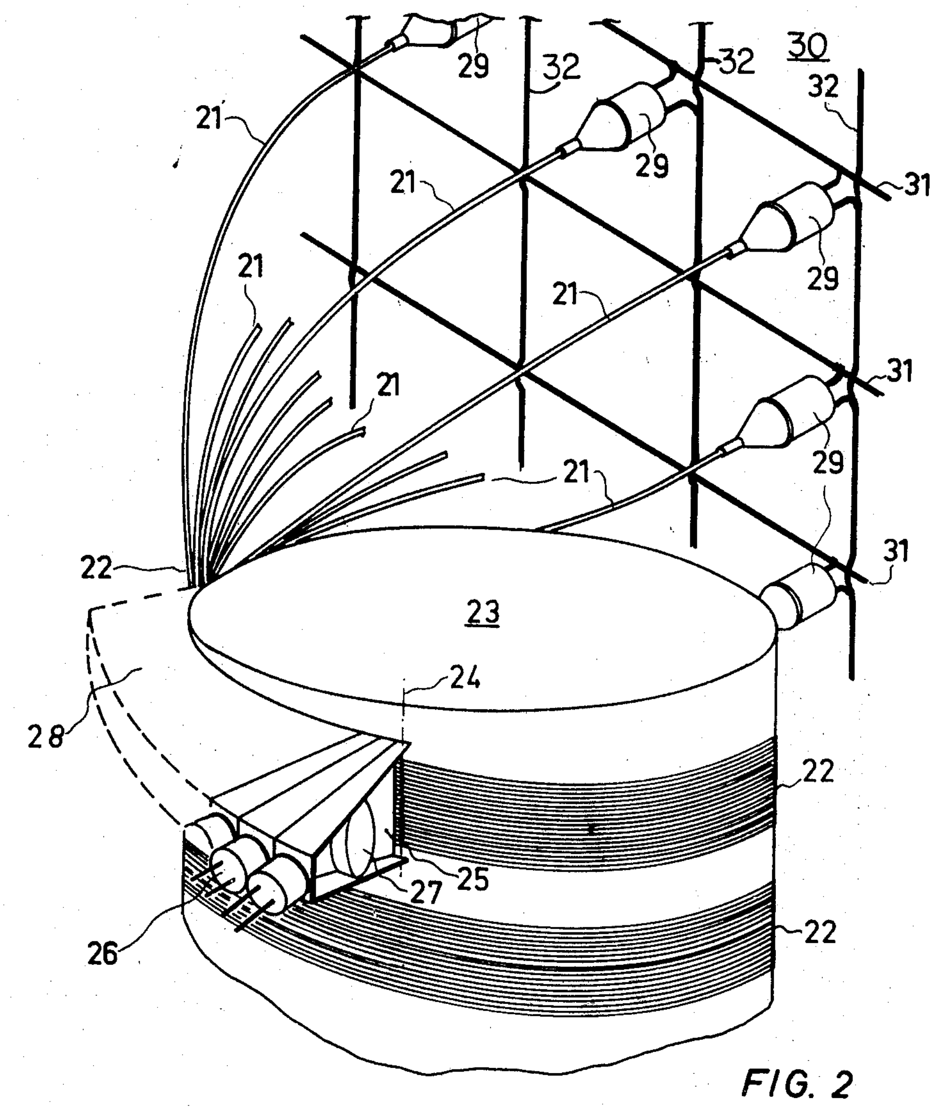
Figure 2A:
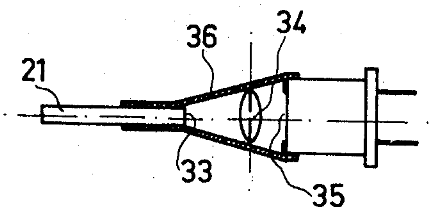

FIG. 2 and 2*a*, respectively, represent a preferred embodiment and the details thereof.

Figure 3:
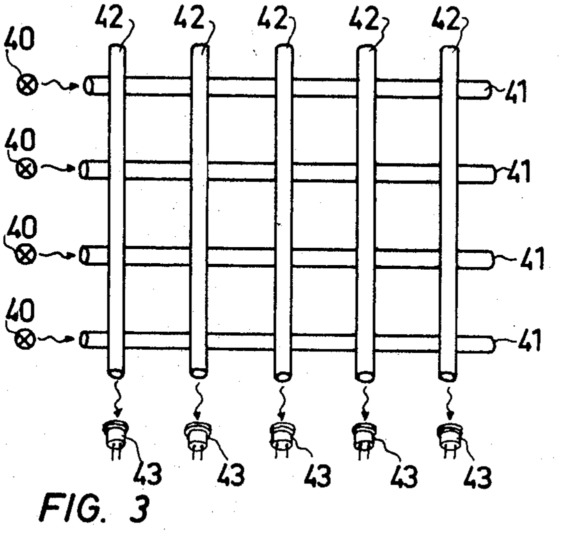
Figure 3A:
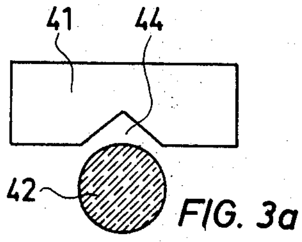

FIG. 3 and 3*a*, respectively, represent another embodiment and the details thereof.

Figure 4:
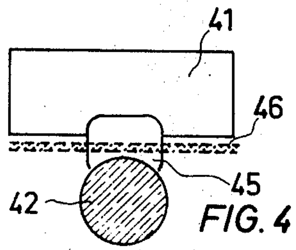

FIG. 4 is a modification of the embodiment of FIG. 3*a*.

Figures 5, 6:
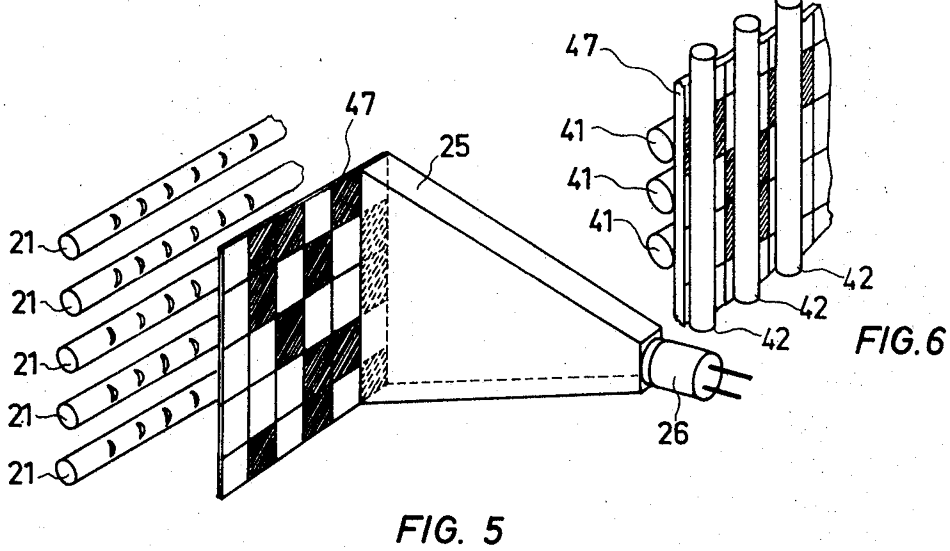

FIG. 5 and FIG. 6, respectively, represent variants of the embodiment of FIGS. 2 and 3.

Optical fibers are formed of thin threads of transparent material having a high refraction index, for instance glass, or plexiglass.

As shown in FIG. 1, a source 1 transmits a flux of radiating electromagnetic energy of suitable wavelength to the input 2 of fiber 3, as through a suitable optical device such as lens 14. This electromagnetic radiation will be hereafter referred to as light, or luminous energy, or illumination, or by similar designation, the reference also including invisible radiations, and more particularly, infrared radiations.

The light rays entering into the fiber at one of its extremities strikes the surface of separation between the internal medium, having a high refraction index, and the external medium, having a lower refraction index, at an angle greater than the angle of total reflection, corresponding to the ratio between the refraction indexes of the two media. Therefore the rays are totally reflected and the light travels along the entire length of the fiber, even in the case where the fiber is bent in any conceivable manner.

At point 4 the fiber surface is cut, or scratched, or altered through some suitable mechanical manner, so that part of the light rays strike a small portion of the surface at an angle smaller than the angle of total reflection. In this manner a small quantity of light is refracted to the outside, and this point will appear bright. The same effect may be attained by depositing a small quantity of a substance having a refraction index equal or greater, or slightly lower than the one of the material of the fiber on the external surface of the fiber. Through such means the value of the angle of total reflection is increased and part of the incident light is refracted to the outside.

Finally, the same effect may be obtained by chemically attacking the surface at predetermined points, such as point 5, thereby causing the surface to become rough and permitting the light to come out of the fiber.

In many instances the optical fibers are covered by a very thin layer of low refraction index that permits their being grouped in bundles, so that the fibers are in mutual contact. This layer is not represented for clarity in FIG. 1, and does not substantially change the described manner of operation. However, in case the alteration is made to the exterior by means of the deposit of materials, such layer must be removed at the altered points.

Suitable photoelectric devices, preferably photodiodes, indicated by numerals 7 to 13, are set alongside the fiber. Under these conditions, each time that the end 2 of fiber 3 is illuminated by the source 1, the photoelectric devices such as photodiodes 8, 10, 13 which are located in alignment with the altered points such as 4, 6, 5 receive a certain quantity of light and generate an electric signal, whereas those, such as photodiodes 7, 9, 11 and 12, which are located at unmodified points, do not generate any signal.

It is therefore apparent that a fiber like the one indicated in FIG. 1, equipped with a light source 1 and a plurality of photoelectric devices 7 . . . 13, forms a memory device able to permanently store a number of information elements, or bits, equal to the number of photoelectric devices which may be located to detect the possible presence of light coming out of the fiber in alignment with the altered surface points, set in sequence along the fiber. To register a sequence of logic values, the surface will be altered at the points corresponding to locations where a ONE is to be recorded.

FIG. 2 indicates a possible disposition of a plurality of fibers and photodiodes, so as to form a permanent memory system, having a number of words equal to the number of fibers, each word containing a number of bits equal to the number of photoelectric devices which can be located along the respective fiber.

According to said embodiment of the invention, the optical fibers are arranged one beside the other to form a flat ribbon 22, having a thickness equal to the diameter of the fibers in a manner such that the locations correspond to homologous bits, that is, to bits occupying the same place in the different words, are aligned across the tape. The ribbon is then wound around a cylinder 23 of a suitable diameter. If the length of the ribbon is larger than the circumference of the cylinder, the ribbon is helically wound on the cylinder, as shown in the figure. The ribbon contains a finite number of positions of possible alterations of the surface, each one corresponding to an alignment of homologous bits, as indicated at 24. A cell 25 obtained by means of opaque screens suitably arranged, is associated with each one of said alignments, and the face of the cell opposite to the alignment 24 is occupied by a photoelectric device, such as the photodiode 26. The cell is represented, in the figure, with a side wall removed, and at the inside of the cell there is an optical element, such as the cylindrical lens 27, able to concentrate the the light emitted from any altered point located along the alignment 24 on the receiving surface of diode 26. Said cells, on the whole, assume the position of body 28, located on the surface of the cylinder, and have a helical axis, as represented in FIG. 2 in a partial and schematical way.

At one end of the ribbon the single optical fibers 21 are reciprocally separated and spread out so that each one may be assigned to one light source, such as the electroluminescent diodes 29.

The two terminals of said diodes are connected to a conductor matrix 30, composed, for example, of a plurality of horizontal conductors 31 and a plurality of vertical conductors 32. Each diode has one of its terminals connected to a horizontal conductor 31 and the other to a vertical conductor 32, near their crossing point. These electroluminescent diodes emit light when a voltage higher than a threshold value V is applied between their terminals. Each diode is connected by means of a conical opaque fitting 36 to the end 33 of the assoicated optical fiber 21 as indicated in FIG. 2*a*. This fitting preferably contains an optical member, for instance, the converging lens 34, concentrating the light emitted by the active surface 35 of the electroluminescent diode at the end 33 of the fiber 21.

When a positive voltage pulse, somewhat smaller than +V is applied to one of the horizontal conductors 31 and, at the same time, a negative voltage pulse, somewhat smaller in absolute value that —V, is applied to one of the vertical conductors, only the electroluminescent diode connected to these two conductors is subject to a voltage higher than the voltage threshold V, and results in a light pulse. This light pulse is transmitted along the associated fiber. A part of the luminous energy is refracted to the outside at the points where the surface had been altered to register a ONE, and generates electrical signals in the corresponding aligned photodiodes. Therefore all bits forming the word recorded on said fiber are read practically simultaneously. The matrix formed by the conductors 31 and 32 permits the selective insertion of light pulses into each fiber to read the words registered therein.

According to another embodiment, schematically shown in FIG. 3, the optical write fibers 41, along which the light pulses generated by sources 40 are transmitted, are parallely located in a plane and other read optical fibers 42 are arranged perpendicularly to them. These read fibers guide the luminous energy emanating from the altered points of the write fibers to the photoelectric devices 43. As may be seen from the drawing on a larger scale, FIG. 3*a*, the alternation of the surface of the write fiber 41, at the points where a ONE is to be recorded, is obtained by means, for example, of a V-shaped cut. In the space 44 formed between said cut and the optical read fiber a certain amount of luminous energy is present, a part of which luminous energy penetrates into read fiber 42. This part of luminous energy propagates along the read fiber 42, by total reflection, until it reaches the photoelectric device 43. As the light cannot leave the fiber through the lateral surface, the danger of stray light pulses penetrating into a write fiber different from the one lighted at its end and causing disturbing signals, is avoided.

If the alteration of the surface is obtained through the deposition of a small quantity of a substance having a suitable reflection index, as indicated in FIG. 4, the reentering of luminous energy from the read fiber 42 into the write fiber 41 may be avoided by the proper choice of the values of the refraction indices of the material forming the write and read fibers and of the substance 45 deposited at the crossing point. Optionally, an optical element 46 which permits the transmission of light in only one direction may also be used, as shown in FIG. 4 by dotted lines.

A disposition, which may be preferred in some cases, is schematically represented in FIG. 5 which may be applied to the embodiment of FIG. 2, and in FIG. 6 which may be applied to the embodiment of FIG. 3. In FIG. 5 the ribbon of fibers has been represented, for simplicity sake, as disposed in a plane instead of a cylindrical surface as in FIG. 2. According to this disposition the alterations of the fibers 21 (FIG. 5) and 41 (FIG. 6) are effectuated in correspondence of all the positions corresponding to all single bits, as if all bits should have the logical value ONE.

Between the altered write fibers and the reading system which, in the case of FIG. 5, comprises cells 25 and photodiode 26, and in the case of FIG. 6, comprises the reading fibers 42 and the associated photodiodes, not shown, a transparent plate 47 is interposed. On said plate, the regions which correspond to these altered points on which a ZERO should be registered have been made opaque, for instance by photographic means. It is possible thus to change the contents of the memory simply by changing the plate 47.

What is claimed is:

1. A memory for the storage and retrieval of datum comprising an elongated electromagnetic radiation transmitting optical fiber member, the surface of said member being altered at a plurality of positions along the length of said optical fiber member, means for generating electromagnetic radiation proximate one end of said optical fiber member, an electromagnetic radiation detecting means proximate each of said altered positions and adapted to provide an electrical signal responsive to detection of electromagnetic radiation being transmitted through said optical fiber.

2. A memory for the storage and retrieval of datum as specified in claim 1 and including means to selectively control the time at which said means for generating electromagnetic radiation generates the electromagnetic radiation being transmitted through said optical fiber.

3. A memory for the storage and retrieval of data comprising a plurality of elongated electromagnetic radiation transmitting optical fiber members, each of said members having the surface thereof altered at pre-selected positions along the respective lengths of said optical fiber members means for generating electromagnetic radiation proximate one of the respective ends of each of said optical fiber members, electromagnetic radiation detection means proximate the respective altered positions along the respective lengths of said optical fiber members and adapted to provide electrical signals responsive to the detection of electromagnetic radiation being transmitted through the particular optical fiber members.

4. A memory for the storage and retrieval of data as specified in claim 3 and including means to selectively control the time at which said means for generating electromagnetic radiation generates electromagnetic radiation to be transmitted through preselected optical fiber members.

5. A memory for the storage and retrieval of data as specified in claim 4, wherein the optical fiber members are disposed in close parallel array to form a ribbon having a thickness of one optical fiber member, and the altered positions along preselected optical fiber members are disposed in alignment transverse the longitudinal axis of said ribbon.

6. A memory for the storage and retrieval of data as specified in claim 5, and wherein said electromagnetic radiation detection means is responsive to all transverse aligned altered points in one aligned position transverse the longitudinal axis of said ribbon.

7. A memory for the storage and retrieval of data as specified in claim 4, and wherein said electromagnetic radiation detection means comprises an elongated collecting optical fiber between said respective aligned altered points and said radiation detection means.

8. A memory for the storage and retrieval of data comprising a plurality of parallel disposed elongated electromagnetic radiation transmitting optical fiber members, each of said members having the surface thereof altered at preselected positions along the length of said member, a plurality of parallel-disposed elongated electromagnetic radiation collecting members disposed transversely to the lengths of said fiber members, said altered positions of said fiber members being disposed to transmit radiation to preselected ones of said collecting members, and selector means interposed between said fiber members and said collecting members to block the transmission of radiation from preselected altered positions of said fiber members to said collecting members.

References Cited

UNITED STATES PATENTS 3,360,657 12/1967 Schlesinger ---------- 350—96
3,432,675 3/1969 Roby --------------- 350—96

TERRELL W. FEARS, Primary Examiner

U.S. Cl. X.R.

350—96, 160, 169